Feb. 16, 1965  R. D. SCHAD  3,169,688
THIN WALLED CONTAINER
Filed July 25, 1960
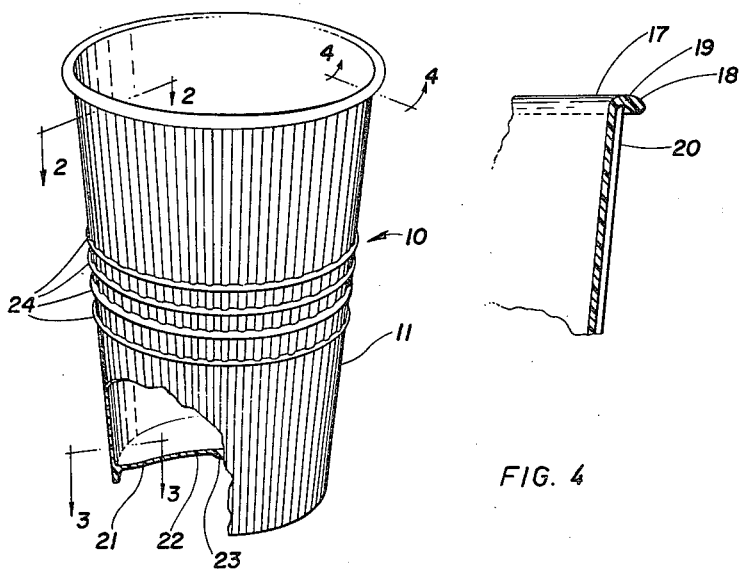
FIG. 4
FIG. 1
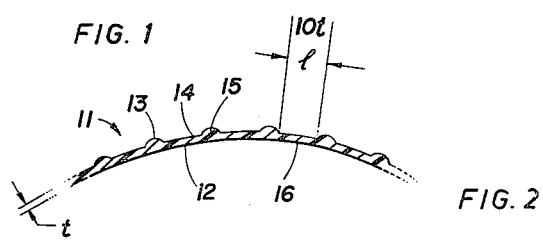
FIG. 2
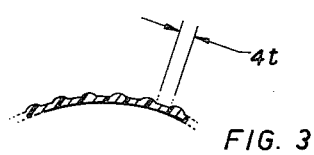
FIG. 3
Inventor
ROBERT DIETRICH SCHAD
by: *Cavanagh & Norman*

United States Patent Office 3,169,688
Patented Feb. 16, 1965

3,169,688
THIN WALLED CONTAINER
Robert Dietrich Schad, Toronto, Ontario, Canada, assignor, by mesne assignments, to Traders Leasing Ltd., Toronto, Ontario, Canada
Filed July 25, 1960, Ser. No. 45,094
4 Claims. (Cl. 229—1.5)

This invention relates to a thin walled container especially of cup-like configuration and adapted to be molded from thermo plastic material by injection molding techniques.

In recent years, various attempts have been made to provide a coffee cup or the like formed of plastic materials by injection molding. Medium impact hight heat thermo plastic materials such as polystyrene may be regarded as the most suitable plastic material for such purpose having regard to the usage of such thin walled containers. Such containers should have a desirable degree of rigidity and preferably should not conduct heat rapidly. All of the injection molded plastic coffee cups or the like available to the present time are subject to relatively rapid heat transfer through the walls thereof to the fingers of the user leading to greater discomfort than is the ordinary experience with the well known paper cup. To overcome this disadvantage, attempts have been made to provide a foamed cellular structure plastic cup of relatively thick walled construction through which the heat transfer is negligible and therefore comfortable in use. When forming foam cellular structure plastic cups in volume production, it has not been the experience of manufacturers to date to find an economical and satisfactory means for sealing the particles of a cup in such manner as to prevent leakage during use. In fact foamed plastic cup constructions presently available on the market and generally available in Canada at this time are known to suffer severely from this disadvantage.

Injection molded plastic cups in addition to being subject to rapid heat transfer through the walls thereof are relatively brittle and may break during storage and use. The damage by breakage is ordinarily sufficiently large that it must be taken into account for comparing costs against paper cups.

In general, therefore, while various attempts have been made to provide molded thin walled containers and especially plastic cups as a substitute for corresponding paper products, the products formed of plastic materials have not been successful to a degree that it could be said at this time that plastic articles are replacing paper containers though the attempt for a practical substitution is apparent.

In the forming of thermo platsic coffee cup structures by injection molding, it has been found that the minimum wall thickness for material saving is of the order of $18/1000$ of an inch and that any lesser wall thickness which could afford a material saving delivers a product of unsatisfactory rigidity and of unduly frangible properties.

Having regard to the foregoing, it is the main object of this invention to provide a thin walled container formed of thermo plastic material of a form adapted to be injection molded and characterized by a sectional contour affording rigid cracking resistance and low heat transfer characteristics.

It is another object of the present invention to provide a thin walled contained structure adapted for fabrication from a thermo plastic material by injection molding techniques in which at least one wall is formed of a plurality of substantially equally spaced substantially parallel rib-like formations extending from a surface of a thin wall and forming a part of the latter, the effective sectional diameter of each of said rib-like formations being of the order of greater than twice the thickness of said wall that is, 0.036" and the maximum distance between said ribs being less than twenty times the thickness of said wall that is, 0.36" and preferably of the order of about ten times the thickness of said wall that is, 0.18".

It is a further object of the present invention to provide a container structure generally in the form of a frusto conical coffee cup or the like and having an inwardly directed convex base adapted for thermal expansion substantially to maintain its convexity in part at least.

Other objects of the invention will be appreciated by a study of the following specification taken into conjunction with the accompanying drawings.

In the drawings:

FIGURE 1 is a perspective view of a thin walled container structure of the invention of frusto conical coffee cup form having a portion thereof cut away to reveal the form of the base or bottom wall thereof;

FIGURE 2 is a section on the line 2—2 of FIGURE 1;

FIGURE 3 is a section on the line 3—3 of FIGURE 1; and,

FIGURE 4 is a section on the line 4—4 of FIGURE 1.

Referring now to the drawings, the thin walled structure 10 disclosed herein by way of example only is characterized by at least one wall portion 11 being the frusto conical wall of the coffee cup structure shown of improved form by virtue of sectional figures displayed in FIGURES 2 and 3.

In the sectional illustrations of FIGURES 2 and 3, being sections on the lines 2—2 and 3—3 of FIGURE 1, the wall 11 is shown comprised of a wall base portion 12 of predetermined thickness "$t$." Integrally formed therewith are the ribs or beads 13 preferably extending from one surface being the outer surface 14 thereof outwardly to describe a rib body 15 of effective diameter, i.e., of minimum transverse dimension of the order of greater than two times the thickness "$t$" and preferably $5t$ that is, about .036" to .09".

The distance between the ribs or beads should be of a predetermined maximum whereby the unsupported portion 16 of wall 12 is of satisfactory maximum length in relation to its thickness to ensure the desired rigidity in the unsupported portion. Accordingly, the unsupported distance "$l$" should be of the order of $15t$ maximum and preferably of a value of about $7t$ that is, about 0.126" to 0.27". In FIGURE 3 it will be observed that by virtue of the frusto conical nature of the wall 1, the unsupported distance "$l$" in the region 3—3 is of the order of about $4t$ that is, about 0.072".

The terminal edges of the container should be formed such as fortuitously to endow the structure with the additional rigidity and functional appeal on contact with the user. Thus the outer terminals 17 of structure 10 presents an outwardly drawn flange portion 18 of a thickened wall section 19 of the order of about $3t$ that is, about 0.054" in thickness and extending over and integrally joined with the upper extremities of the ribs 20 of the ribs 13 substantially in the manner indicated in FIGURE 4.

In order to overcome the thermal expansion effects or other effects which may result in distortion of bottom wall 21 integrally formed with and forming a part of structure 10, the same preferably exhibits an inward convexity defined by the inward curvature 22 terminating centrally in an outwardly directed sprue formation 23 defining the mold injection point for material injected to form the container structure in the mold in an injection molding machine. The convexity of wall 21 permits the same to expand on heating to greater convexity or to be stretched to lesser convexity due to heating of the walls 11 and their circumferential expansion to effective greater diameter in the region of the bottom wall.

Tests have shown that contact of the hand of the user with the closely spaced rib-like formation of the container walls permits a spacing of the surfaces of the fingers from the unsupported wall portions extending between the ribs thus effectively to insulate the finger surfaces and to present a relatively cool exterior for handling of hot liquids. The rib-like formation of the side walls in the manner described obstructs progressive fracture whereby slight damage to the container does not render it incapable of practical use.

In referring to parallel spaced apart rib-like formations or beads it will be understood that the same may be of curved nature concentrically arrayed or substantially so as for example a plurality of concentric ring-like configurations or ribs adhering to the requirements of FIGURE 2 in section.

While the invention has been described with reference especially to a cup-like structure adapted particularly to the serving of coffee and of a form disposable by virtue of its cheapness and susceptibility to mass production in satisfactory volume by known techniques, it will be appreciated that inherent aspects of the invention are to be found in the combination of ribs and wall structure coming within the requirements set forth in this specification. The removal of some of the material from the ribs such as to define indented configurations thereof representing alphabetical or other designs, does not materially influence the utility of the resulting container as a whole. Furthermore, for decorative purposes it may be desired to integrally form additional ribs extending transversely as identified by numeral 24 in FIGURE 1. It has been found that the unsupported wall thickness need only be of the order of about ⅓ the wall thickness demanded in prior plastic wall structures for the same purpose. In addition and especially in coffee cup structures, the material saving as compared with previous structures of substantially uniform wall thickness is in excess of 20% representing a large factor in the cost of the article. Obviously the wall structure formation of the invention may be utilized in thin walled containers of other forms than that particularly disclosed herein and accordingly the disclosure herein does not intend to limit the utility of the invention to the specific application disclosed but rather only to the subject matter set forth herein having regard to the scope of the following claims and the prior art.

What I claim is:

1. A molded plastic drinking cup of substantially uniform waterproof composition throughout, having a generally frustro-conical shape, comprising: a solid side wall of generally uniform thickness, a plurality of ribs formed integrally as a part of said wall, said ribs:
   (a) being formed on the outer face of the side wall, evenly spaced about the circumference thereof;
   (b) extending longitudinally along the major portion of the conical wall surface;
   (c) having a width along the circumference of the cone of .036" to .09"; and
   (d) the maximum distance between the ribs being 0.27" extending beyond the wall at least .018";
   and at least one circumferential band, said band:
   (a) being formed integrally as a part of the cup wall;
   (b) being integrally united at the points of intersection with the longitudinal ribs;
   (c) extending outwardly of the cup wall at least as far as said longitudinal ribs; and
   (d) located intermediate of the rim and bottom of the cup wall.

2. A molded plastic drinking cup of substantially uniform waterproof composition throughout, having a generally frustro-conical shape, comprising: a solid side wall of generally uniform thickness and a plurality of ribs formed integrally as a part of said wall, said ribs:
   (a) being formed on the outer face of the side wall, evenly spaced about the circumference thereof;
   (b) extending longitudinally along the major portion of the conical wall surface;
   (c) having a width along the circumference of the cone of 0.036" to .09";
   (d) extending beyond the wall, at least 0.018"; and
   (e) the maximum distance between the ribs being 0.27".

3. A cup as defined in claim 2, having an outwardly directed, flanged lip, formed integrally with the body of the cup wall and having a flange width of about three times the thickness of the wall.

4. A cup as defined in claim 2, having a bottom integrally formed with the wall, said bottom having an appreciable convexity.

References Cited in the file of this patent
UNITED STATES PATENTS

| | | |
|---|---|---|
| 1,247,678 | Hentschel | Nov. 27, 1917 |
| 2,530,124 | Kieckhefer | Nov. 14, 1950 |
| 2,805,790 | Smucker | Sept. 10, 1957 |
| 2,853,222 | Gallagher | Sept. 23, 1958 |
| 3,045,887 | Caine | July 24, 1962 |